US006253148B1

(12) United States Patent
Decaux et al.

(10) Patent No.: US 6,253,148 B1
(45) Date of Patent: Jun. 26, 2001

(54) INFORMATION SYSTEM FOR INFORMING USERS OF A PUBLIC TRANSPORT NETWORK ABOUT WAITING TIMES AT STOPS IN THE NETWORK

(75) Inventors: Jean-Claude Decaux, 88 Boulevard Maurice Barrès, - 92200 Neuilly sur Seine (FR); Jacques Le Gars, Gambais (FR)

(73) Assignee: Jean-Claude Decaux (FR)

( * ) Notice: Subject to any disclaimer, the term of this patent is extended or adjusted under 35 U.S.C. 154(b) by 0 days.

(21) Appl. No.: 09/114,236

(22) Filed: Jul. 1, 1998

(30) Foreign Application Priority Data

Jul. 4, 1997 (FR) .................................................. 97 08506

(51) Int. Cl.[7] ............................ G08G 1/123; G06F 15/48

(52) U.S. Cl. .......................... 701/204; 340/910; 340/994; 340/917; 342/457; 342/42; 246/5; 455/405

(58) Field of Search ............................. 701/204; 364/436, 364/443; 455/31.2

(56) References Cited

U.S. PATENT DOCUMENTS 4,791,571 * 12/1988 Takahashi et al. ................... 364/436
5,483,454 * 1/1996 Lewiner et al. ..................... 364/443
5,740,046 * 4/1998 Elestedt ................................ 364/436
5,970,389 * 10/1999 Lwiner et al. ...................... 455/31.2

FOREIGN PATENT DOCUMENTS

WO 83/04451 * 6/1983 (DK) .
2751112 * 1/1996 (FR) .
WO 96/04634 * 2/1996 (FR) .

* cited by examiner

*Primary Examiner*—William A. Cuchlinski, Jr.
*Assistant Examiner*—Tuan C To
(74) *Attorney, Agent, or Firm*—Piper Marbury Rudnick & Wolfe

(57) ABSTRACT

An information system for informing users of a bus network about waiting times for buses at stops in the network. The system includes a system for locating buses coupled to a central point which broadcasts said positions at successive instants θ to receivers adapted to calculate waiting times for the buses on the basis of their positions, which positions reach the receivers after a certain average length of "transit" time T. In order to ensure that calculated waiting times as are accurate as possible, the central computer point broadcasts to the receivers estimated positions that the buses are expected to occupy at instant θ+T.

13 Claims, 1 Drawing Sheet

FIG.1.
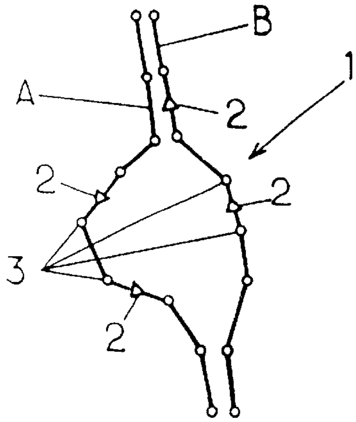
FIG.2.
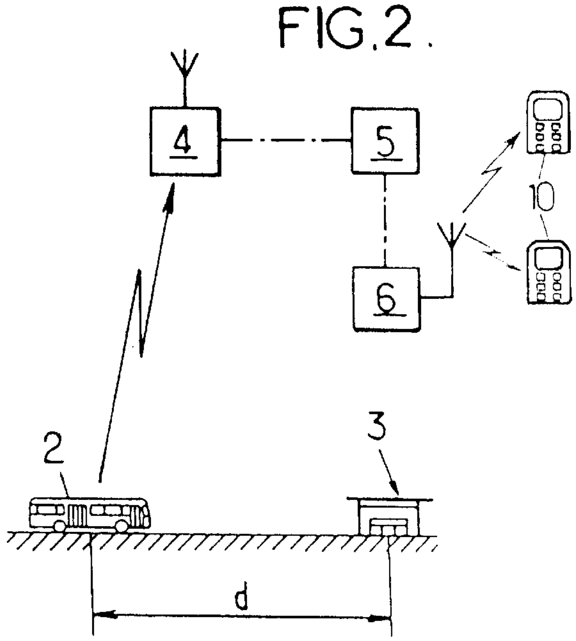
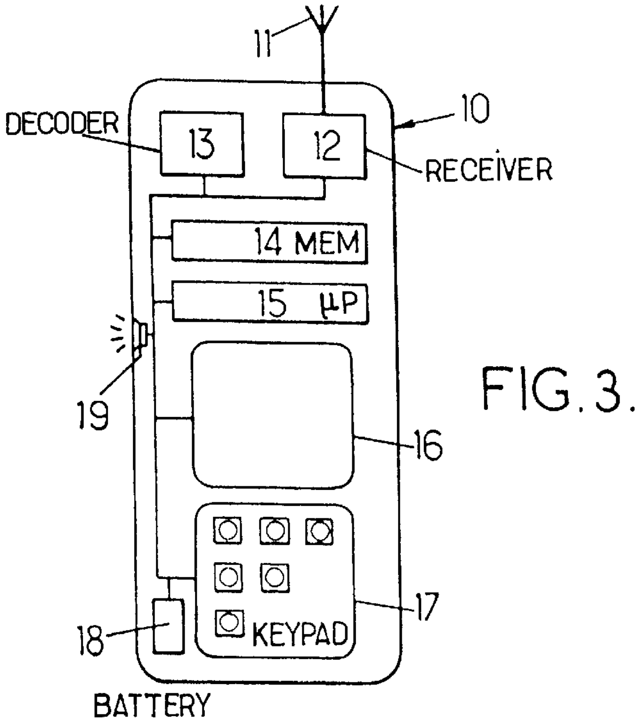
FIG.3.

INFORMATION SYSTEM FOR INFORMING USERS OF A PUBLIC TRANSPORT NETWORK ABOUT WAITING TIMES AT STOPS IN THE NETWORK

FIELD OF THE INVENTION

The present invention relates to information systems for informing users of public transport networks about waiting times at stops in such networks.

More particularly, the invention relates to an information system for informing users of a public transport network about waiting times for public transport vehicles at stops of the network, the information system comprising:

- electronic information devices, each provided with an interface for informing users about waiting times for public transport vehicles, each of said information devices being adapted to determine the waiting times for said public transport vehicles on the basis of successive positions of said public transport vehicles;
- a central computer point adapted to broadcast repetitively to the information devices new positions for the public transport vehicles, said broadcasting beginning at successive transmission instants θ and said positions reaching the information devices after a certain average transit time T has elapsed from each broadcast instant θ; and
- a locating system adapted to locate the public transport vehicles and to send data to the central computer point representing the position xi(ti) of each public transport vehicle in association with the instant ti at which the vehicle was located.

BACKGROUND OF THE INVENTION

Document WO-A-94/02923 describes an example of such an information system.

The information system described in that document provides satisfaction, but it appears to be desirable to refine the estimates of waiting time as performed by the electronic information devices of the system.

That is the particular object of the present invention.

OBJECTS AND SUMMARY OF THE INVENTION

To this end, according to the invention, in the information system of the kind in question, the central computer point is adapted:

- prior to each broadcast instant θ, to estimate the position xi(θ+T) that each public transport vehicle is expected to have at instant θ+T , as a function of the prior positions of the public transport vehicles; and
- then, at the broadcast instant θ, to transmit said estimates xi(θ+T) to the information devices as the new positions of the public transport vehicles.

By means of these dispositions, the information devices have data available that faithfully represents the positions of the public transport vehicles at the moment at which said devices receive the data, thereby enabling the information devices to calculate a very accurate estimate of waiting times at stops in the public transport network, and this is achieved while transmitting a minimum volume of data to the information devices.

In particular, it is not necessary to transmit to the information devices the instants ti at which the various public transport vehicles were located.

This provides a saving the time required for data transmission to the information devices, and a saving in occupancy of the transmission network.

In preferred embodiments of the invention, use may optionally be made of one or more of the following dispositions:

- at least some of the information devices are portable receiver appliances for receiving one-way radio paging, with the positions of the public transport vehicles being broadcast to said information devices by radio;
- the public transport vehicles are buses;
- the central computer point is adapted to estimate the position which each public transport vehicle is expected to have at instant θ+T by calculating a distance Li that said vehicle will normally travel between instants ti and θ+T, using the formula:

$$Li = Vi.(\theta + T - ti)$$

where Vi is an estimated speed for the public transport vehicle, the central computer point being adapted to calculate estimated speeds Vi as a function of earlier positions of the public transport vehicles;

- when the most recently known position of said public transport vehicle is not at a stop in the public transport network, the central computer point is adapted to calculate the estimated speed Vi of each public transport vehicle as being an average speed travelled by said public transport vehicle;
- when the position of said public transport vehicle as identified by the locating system has been at the same stop for a length of time greater than a predetermined first duration, the central computer point is adapted to calculate the estimated speed Vi of each public transport vehicle as being a past average speed of said public transport vehicle;
- when the last known position of the public transport vehicle is for the first time at a stop of the public transport network, the central computer point is adapted to calculate the estimated speed Vi of each public transport vehicle as being equal to zero during a second predetermined duration, followed, after said second predetermined duration has elapsed, by Vi, where Vi is a past average speed of the public transport vehicle in question;
- said past average speed is calculated over a period having a duration of less than 1 min;
- said past average speed is an average speed calculated over a period of duration less than 5 min, multiplied by a correction factor lying in the range 1.1 to 1.5;
- said past speed is the most recent non-zero speed of the public transport vehicle calculated between two successive located positions of said vehicle;
- the central computer system is adapted to correct the most recent position xi(ti) of each public transport vehicle on the assumption that said public transport vehicle is at a stop of the public transport network if the most recent position is at a distance from said stop which is less than a certain limit value, which limit value may lie in the range 10 m to 50 m;
- the positions of the public transport vehicles at instant θ+T are estimated by the central computer point as a function of at least one parameter other than the data received from the locating system, the central computer point being adapted to compare the positions estimated in this way with the subsequent real positions of the public transport vehicles, and to adjust said parameter as a function of said comparison; and the central computer point is adapted:

to receive data from at least one of the information devices;

to determine in this way, after each broadcast instant θ, the real instant at which said information device actually receives the positions as broadcast at said broadcast instant; and to adjust the value of the average transit time T as a function of said real instant of reception.

BRIEF DESCRIPTION OF THE DRAWING

Other characteristics and advantages of the invention appear on reading the following description of embodiments given by way of non-limiting example with reference to the accompanying drawing.

In the drawing:

FIG. 1 is a diagrammatic view of a line in a bus network;

FIG. 2 is a diagrammatic view of an information system constituting an embodiment of the invention, enabling users of the bus network to be informed concerning waiting times at stops in the network; and FIG. 3 is a block diagram of a portable information appliance of the information system shown in FIG. 2.

MORE DETAILED DESCRIPTION

In the figures, the same references are used to identify elements that are identical or similar.

FIG. 1 is a diagram of a bus line 1 forming part of a city network, with buses 2 travelling therealong that are represented by arrows pointing in their travel direction.

The line 1 comprises two routes (i.e. it follows two different paths) A and B in opposite directions, each having various stops 3.

As explained in detail in document WO-A-94/02923, and as shown in FIG. 2, the real position of each bus 2 is determined at regular time intervals by a locating system 4 which receives position data relating to each bus 2 by any conventional means, preferably by radio.

The position data in question can be sent by the buses themselves, e.g. using an on-board positioning device, in particular of the GPS type, etc.

For each bus 2 of the network (represented by an index i), the locating system 4 thus stores:

data corresponding to the position xi(ti) of said bus on the route A, B that it is currently following; and the instant ti at which it was determined as being in said position.

At regular time intervals, e.g. every 20 seconds (s) to 30 s, the locating system 4 sends all of the positions xi(ti) together with the corresponding instants ti to a central computer point 5.

On the basis of the data received from the locating system 4, the central computer point 5 generates messages at regular time intervals, e.g. lying in the range 20 s to 40 s, which messages include an identifier for each bus 2, referred to herein as its index i, together with the position xi of the bus.

For each bus 2 in the network, its position xi in question may comprise, for example:

an indication of the line and of the route A or B being followed by the bus;

an indication of the next stop 3 that the bus is going to reach, or at which the bus is already located; and the distance d between the bus and said next stop.

The messages in question are broadcast by the central computer point 5 at broadcast instants θ to at least one one-way radio-messaging transmitter 6 which operates, for example, in compliance with the ERMES or some other standard. The transmitter 6 transmits said messages to the electronic information devices 10 which are advantageously constituted, at least in part, by one-way radio-messaging portable receivers that have been specially programmed.

These messages are received by the receivers 10 after a certain average transit time T which may be equal to 10 s to 20 s, for example.

As shown in FIG. 3, each receiver 10 may conventionally comprise:

an antenna 11 associated with a radio-messaging receiver device 12;

a circuit 13 for decoding said messages;

a memory 14;

a microprocessor 15;

a screen 16 or other display device;

a keypad 17 or other input device;

a battery 18 or other self-contained electricity power supply; and a loudspeaker 19 or other sound signal emitter.

As explained in document WO-A-94/02923, the microprocessor 15 of each receiver 10 is programmed:

to respond to the radio messages received from the central computer point 5 by generating information relating to waiting times or the next bus(es) 2 at a given stop 3 on a given route of the bus network; and to cause said information to appear on the screen 16 as a function of questions input by the user.

In order to ensure that the waiting times generated in this way are as accurate as possible, the positions xi of the various buses which are transmitted to the central computer point 5 for forwarding to the receivers 10 are positions estimated at instant θ+T so that said positions correspond substantially to the positions genuinely occupied by the buses 2 at the time said positions are actually received by the receivers 10.

As a result, each time a receiver 10 receives a radio message giving the positions xi of various buses in the network, it stores not only the positions xi, but also the instant t at which the message arrives, and thereafter it assumes that said positions xi are valid for the instant t when computing waiting times for buses.

The receivers 10 can thus perform very accurate computations of estimated waiting time without it being necessary to broadcast to the receivers all of the instants ti that correspond to the respective positions xi as determined by the locating system 4: this serves to avoid increasing the time required to transmit data to the receivers 10, and consequently to avoid pointlessly busying-out the one-way radio-messaging network.

To estimate the position of each bus at instant θ+T, the central computer point 5 uses the positions xi(ti) and also the instants ti at which said positions were measured as previously stored over a plurality of locating cycles.

More precisely, the previously stored data enables the central computer point 5 to compute an estimated speed Vi for each bus, thereby making it possible to estimate the position of the bus at instant θ+T, on the assumption that the bus will travel between instant ti and instant θ+T a distance Li =Vi.(θ+T-ti).

The estimated speed Vi for each bus can be computed in various ways, and in particular as follows:

when a bus is to be found between two stops 3 of the network, or when it has been at the same stop for longer than a predetermined duration (e.g. for more than one locating cycle, i.e. both previously-measured positions of the bus are located at the same stop), then the speed Vi can be equal to a past average speed of the bus, as determined on the basis of positions xi(ti) at instants ti when said positions were measured and previously stored by the central computer point over a plurality of locating cycles; and when the most recently known position of the bus lies for the first time at a stop 3 of the network, then its estimated speed Vi is initially equal to zero for a predetermined duration Ta, e.g. 15 seconds, and then Vi returns to its non-zero value after said 15 seconds have elapsed, with said non-zero value being, as before, the past average speed of the bus.

Advantageously, when a bus 2 is located at a distance from a stop 3 which is less than a limit value D, e.g. where D lies in the range 10 meters (m) to 50 m, then the central computer point 5 assumes that the bus is exactly at the stop 3 in question.

By way of non-limiting example, the past average speed of each bus can be determined as follows:

an average speed computed over a period having a duration of less than 1 minute (min), e.g. about 30 s, said period preferably being immediately prior to the present instant;

an average speed calculated over a period having a duration greater than 5 min, preferably multiplied by a correction factor λ, e.g. lying in the range 1.1 to 1.5 to take account of stops made by the bus during said period; or else the most recent non-zero speed of the bus as calculated between two successive points at which the bus has been located.

In order to further refine position estimates performed by the central computer point 5, it is advantageous to compare the positions as estimated by said central computer point with subsequent real positions of the bus. This comparison can be performed, for example, by extrapolating positions xi'(θ+T) from new real positions xi(ti) as received from the locating system 4 (said extrapolation can be performed using a proportional relationship if the new localization instant ti is subsequent to the instant θ+T corresponding to the previously broadcast positions, and by comparing said extrapolated positions xi'(θ+T) with the previously broadcast positions xi (θ+T). The parameters used in making the estimate are then adjusted as a function of the comparison: in particular, it is possible in this way to adjust the stop times Ta of the buses at the stops in the network, and also the above-mentioned correction factor λ.

To further improve the accuracy of the estimates made by the central computer point, it is possible to couple a radio-messaging receiver 10 to the central point, so as to be in a position to measure the real time actually taken by messages to travel from the central computer point to the radio-messaging receivers 10. This makes it possible to adjust the value of the average transfer time T as a function of the real transfer time.

We claim:

1. An information system for informing users of a public transport network about waiting times for public transport vehicles at stops of the network, the information system comprising:

electronic information devices each provided with an interface for informing users about waiting times for public transport vehicles, each of said information devices being adapted to determine the waiting times for said public transport vehicles on the basis of successive positions of said public transport vehicles;

a central computer point adapted to broadcast repetitively to the information devices new positions for the public transport vehicles, said broadcasting beginning at successive broadcast instants θ and said positions reaching the information devices after a certain average transit time T has elapsed from each broadcast instant θ; and a locating system adapted to locate the public transport vehicles and to send data to the central computer point representing the position xi(ti) of each public transport vehicle in association with the instant ti at which the vehicle was located;

wherein the central computer point is adapted:

prior to each broadcast instant θ, to estimate the position xi(θ+T) that each public transport vehicle is expected to have at instant θ+T, as a function of the prior positions of the public transport vehicles; and then, at the broadcast instant θ, to transmit said estimates xi(θ+T) to the information devices as the new positions of the public transport vehicles.

2. An information system according to claim 1, in which at least some of the information devices are portable receiver appliances for receiving one-way radio paging, with the positions of the public transport vehicles being broadcast to said information devices by radio.

3. An information system according to claim 1, in which the public transport vehicles are buses.

4. An information system according to claim 1, in which the central computer point is adapted to estimate the position which each public transport vehicle is expected to have at instant θ+T by calculating a distance Li that said vehicle will normally travel between instants ti and θ+T, using the formula:

$$Li=Vi.(\theta+T-ti)$$

where Vi is an estimated speed for the public transport vehicle, the central computer point being adapted to calculate estimated speeds Vi as a function of earlier positions of the public transport vehicles.

5. An information system according to claim 4, in which, when the most recently known position of said public transport vehicle is not at a stop in the public transport network, the central computer point is adapted to calculate the estimated speed Vi of each public transport vehicle as being an average speed travelled by said public transport vehicle.

6. An information system according to claim 4, in which, when the position of said public transport vehicle as identified by the locating system has been at the same stop for a length of time greater than a predetermined first duration, the central computer point is adapted to calculate the estimated speed Vi of each public transport vehicle as being a past average speed of said public transport vehicle.

7. An information system according to claim 4, in which, when the last known position of the public transport vehicle is for the first time at a stop of the public transport network, the central computer point is adapted to calculate the estimated speed Vi of each public transport vehicle as being equal to zero during a second predetermined duration, followed, after said second predetermined duration has elapsed, by Vi, where Vi is a past average speed of the public transport vehicle in question.

8. An information system according to anyone of claims 5–7, in which said past average speed is calculated over a period having a duration of less than 1 min.

9. An information system according to anyone of claims 5–7, in which said past average speed is an average speed calculated over a period of duration less than 5 min, multiplied by a correction factor lying in the range 1.1 to 1.5.

10. An information system according to anyone of claims 5–7, in which said past speed is the most recent non-zero speed of the public transport vehicle calculated between two successive located positions of said vehicle.

11. An information system according to claim 1, in which the central computer system is adapted to determine whether each public transport vehicle is at a stop of the public transport network if the most recent position is at a distance from said stop which is less than a certain limit value lying in the range of 10 m to 50 m.

12. An information system according to claim 1, in which the positions of the public transport vehicles at instant q+T are estimated by the central computer point as a function of at least one parameter other than the data received from the locating system, the central computer point being adapted to compare the positions estimated in this way with the subsequent real positions of the public transport vehicles, and to adjust said parameter as a function of said comparison.

13. An information system according to claim 1, in which the central computer point is adapted:

to receive data from at least one of the information devices;

to determine after each broadcast instant $\theta$ the real instant at which said information device actually receives the positions as broadcast at said broadcast instant; and to adjust the value of the average transit time T as a function of a difference between said real instant of reception and said broadcast instant.

* * * * *